US012798520B2

(12) United States Patent

Yamashita et al.

(10) Patent No.: US 12,798,520 B2

(45) Date of Patent: Nov. 17, 2026

(54) WIPER DEVICE

(71) Applicant: Honda Motor Co., Ltd., Tokyo (JP)

(72) Inventors: Jumpei Yamashita, Tokyo (JP); Takeshi Sasaki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 18/655,326

(22) Filed: May 6, 2024

(65) Prior Publication Data

US 2025/0001977 A1 Jan. 2, 2025

(30) Foreign Application Priority Data

Jun. 28, 2023 (CN) ........................ 202321654244.2

(51) Int. Cl.

*B60S 1/34* (2006.01)
*B60S 1/38* (2006.01)
*B60S 1/52* (2006.01)

(52) U.S. Cl.

CPC ............ *B60S 1/3479* (2013.01); *B60S 1/524* (2013.01); *B60S 2001/3843* (2013.01)

(58) Field of Classification Search

CPC .... B60S 1/34; B60S 2001/3843; B60S 1/524; B60S 1/3479; B60S 1/38; B60S 1/3481

USPC .......................... 15/250.001, 250.48, 250.44

See application file for complete search history.

(56) References Cited

U.S. PATENT DOCUMENTS 6,049,939 A * 4/2000 Rutkoske ................ B60S 1/546
15/250.04
2018/0118170 A1* 5/2018 Young ................... B60S 1/3801

FOREIGN PATENT DOCUMENTS

| | | | |
|---|---|---|---|
| CN | 112208484 | * | 1/2021 |
| DE | 102014119511 | * | 3/2016 |
| DE | 2015216045 | * | 2/2017 |
| JP | 2012148588 | | 8/2012 |

* cited by examiner

*Primary Examiner* — Rafael A Ortiz

(74) *Attorney, Agent, or Firm* — JCIPRNET

(57) ABSTRACT

The disclosure provides a wiper device including: an adapter member; a blade structure, including an element portion and a blade portion, where the element portion has an insertion portion and a holding portion, the insertion portion is inserted into an interior of the adapter member, and the holding portion holds the blade portion below the adapter member; a first cover, covering a gap between the holding portion and the adapter member and attached to the adapter member along a first direction perpendicular to an extending direction of the blade structure; and a second cover, covering the gap and attached to the adapter member along a second direction perpendicular to the extending direction.

4 Claims, 5 Drawing Sheets

WIPER DEVICE

CROSS-REFERENCE TO RELATED APPLICATION

This application claims the priority benefit of China application serial no. 202321654244.2, filed on Jun. 28, 2023. The entirety of the above-mentioned patent application is hereby incorporated by reference herein and made a part of this specification.

TECHNICAL FIELD

The disclosure relates to a vehicle component, and more particularly to a wiper device.

DESCRIPTION OF RELATED ART

In recent years, efforts to provide access to sustainable transportation systems that also take into account vulnerable persons such as the elderly and children among traffic participants have been active. In order to achieve the stated purpose, research and development efforts are made to further improve the safety or convenience of transportation through research and development related to visibility. However, in the research and development of visibility, the adapter member of the wiper structure is susceptible to freezing at low-temperature environment, which affects the normal operation and reduces the wiping effect, which is detrimental to the driver's visibility of the environment outside the vehicle. Thus, it is necessary to improve the wiper structure to overcome the above problem.

SUMMARY

The disclosure provides a wiper device capable of preventing an adapter member thereof from freezing in a low-temperature environment.

The disclosure provides a wiper device, including: an adapter member; a blade structure, including an element portion and a blade portion, where the element portion has an insertion portion and a holding portion, the insertion portion is inserted into an interior of the adapter member, and the holding portion holds the blade portion below the adapter member; a first cover, covering a gap between the holding portion and the adapter member and attached to the adapter member along a first direction perpendicular to an extending direction of the blade structure; and a second cover, covering the gap and attached to the adapter member along a second direction perpendicular to the extending direction.

Based on the above, in the wiper device of the disclosure, the first cover and the second cover are provided on the adapter member and are configured to cover the gap between the holding portion of the blade structure and the adapter member. Accordingly, snow water in a low-temperature environment may be prevented from intruding into the interior of the adapter member. Thus, the wiper device of the disclosure may prevent the adapter member thereof from freezing in a low-temperature environment.

In order to make the aforementioned features and advantages of the disclosure comprehensible, embodiments accompanied with drawings are described in detail below.

DESCRIPTION OF THE EMBODIMENTS

In the embodiment of the disclosure, the wiper device further includes an injection nozzle unit, and the injection nozzle unit is configured to inject a washer liquid and is accommodated between one of the first cover and the second cover and the adapter member.

In the embodiment of the disclosure, a top height of the first cover and a top height of the second cover are identical to or less than a top height of the adapter member.

Figure 1:
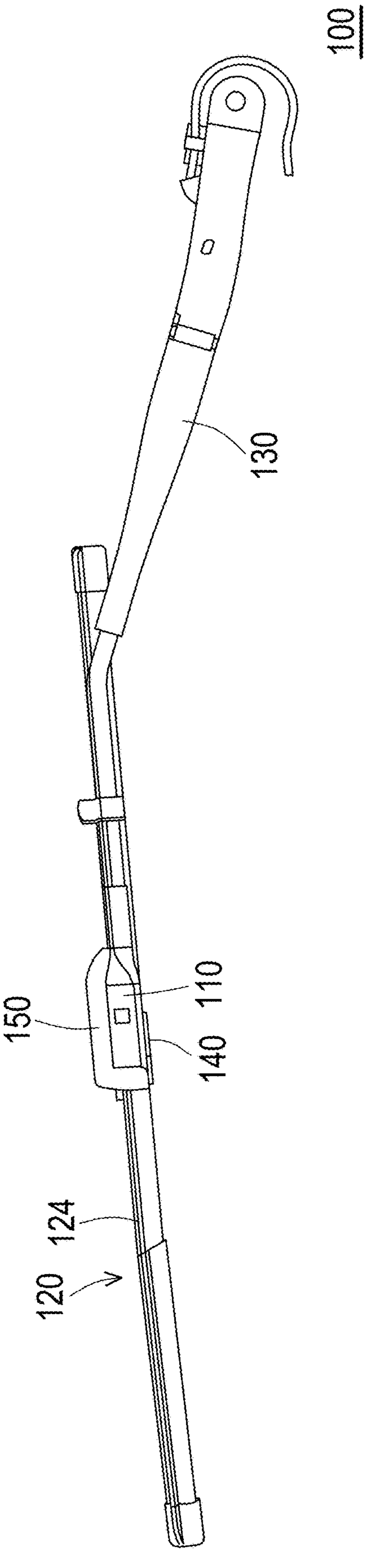
FIG. 1 shows the wiper device in the embodiment of the disclosure.

FIG. 1 shows the wiper device in the embodiment of the disclosure. Referring to FIG. 1, the wiper device 100 of this embodiment includes an adapter member 110, a blade structure 120, and an arm portion 130. The adapter member 110 is installed on the arm portion 130, and the blade structure 120 is connected to the adapter member 110 and may move along with the swing of the arm portion 130 to wipe the windshield of the vehicle. The operating method of the wiper device 100 is a known technology in the art and is not described in detail here.

Figure 2:
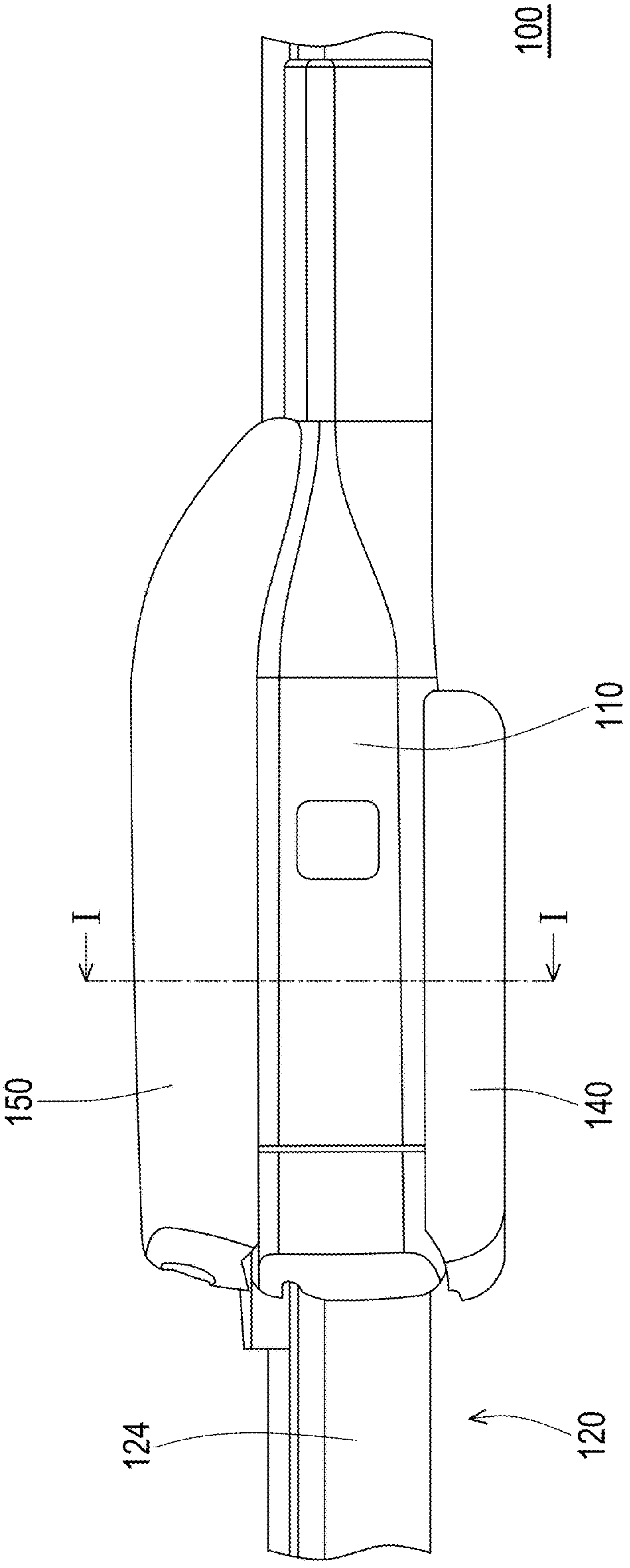
FIG. 2 shows the partial structure of the wiper device of FIG. 1.
Figure 3:
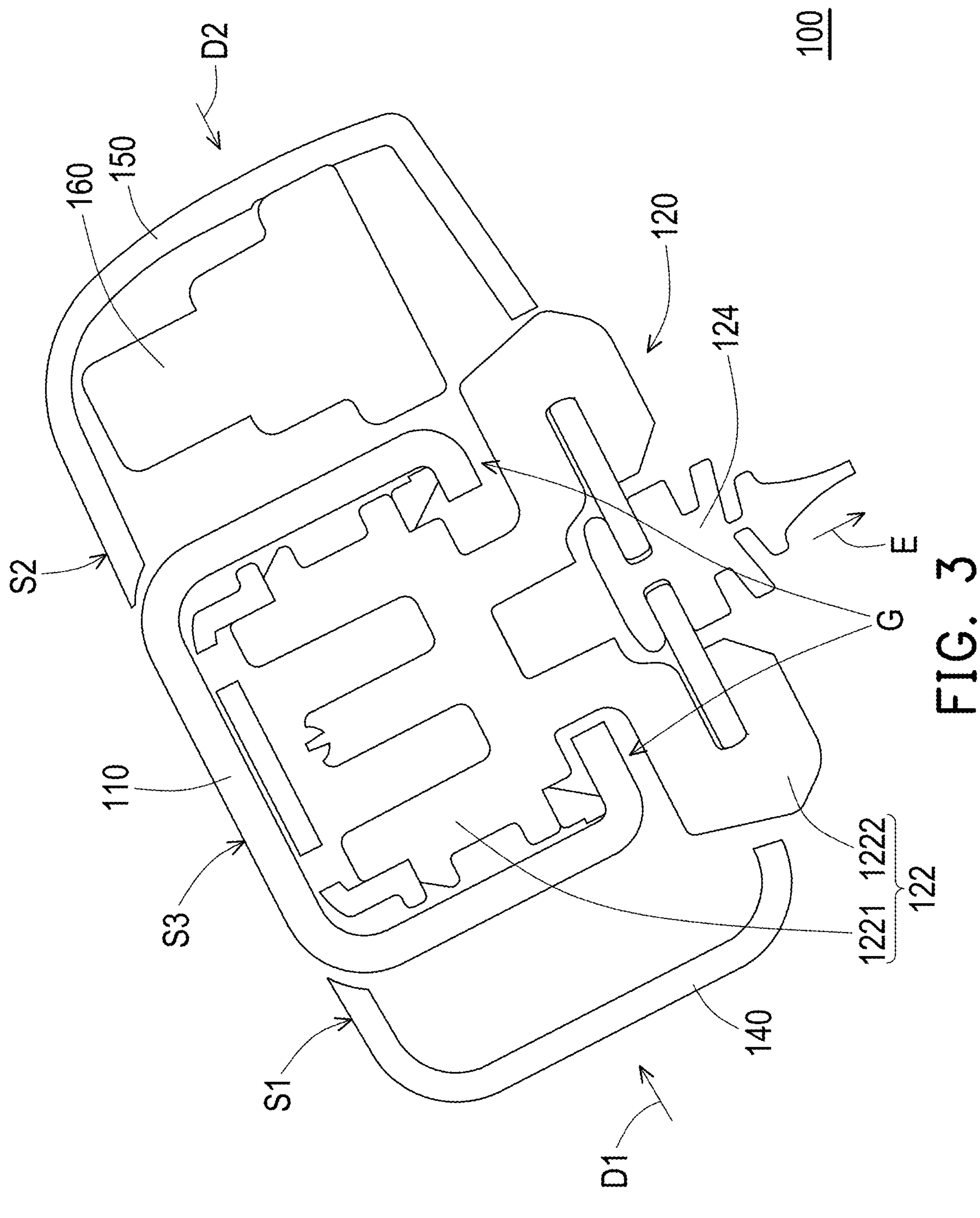
FIG. 3 is a cross-sectional view of the wiper structure in FIG. 2 along the line I-I.

FIG. 2 shows the partial structure of the wiper device of FIG. 1. FIG. 3 is a cross-sectional view of the wiper structure in FIG. 2 along the line I-I. Referring to FIG. 2 and FIG. 3, specifically, the blade structure 120 of this embodiment includes an element portion 122 and a blade portion 124. The element portion 122 has an insertion portion 1221 and a holding portion 1222, the insertion portion 1221 is inserted into an interior of the adapter member 110, and the holding portion 1222 holds the blade portion 124 below the adapter member 110.

Figure 4:
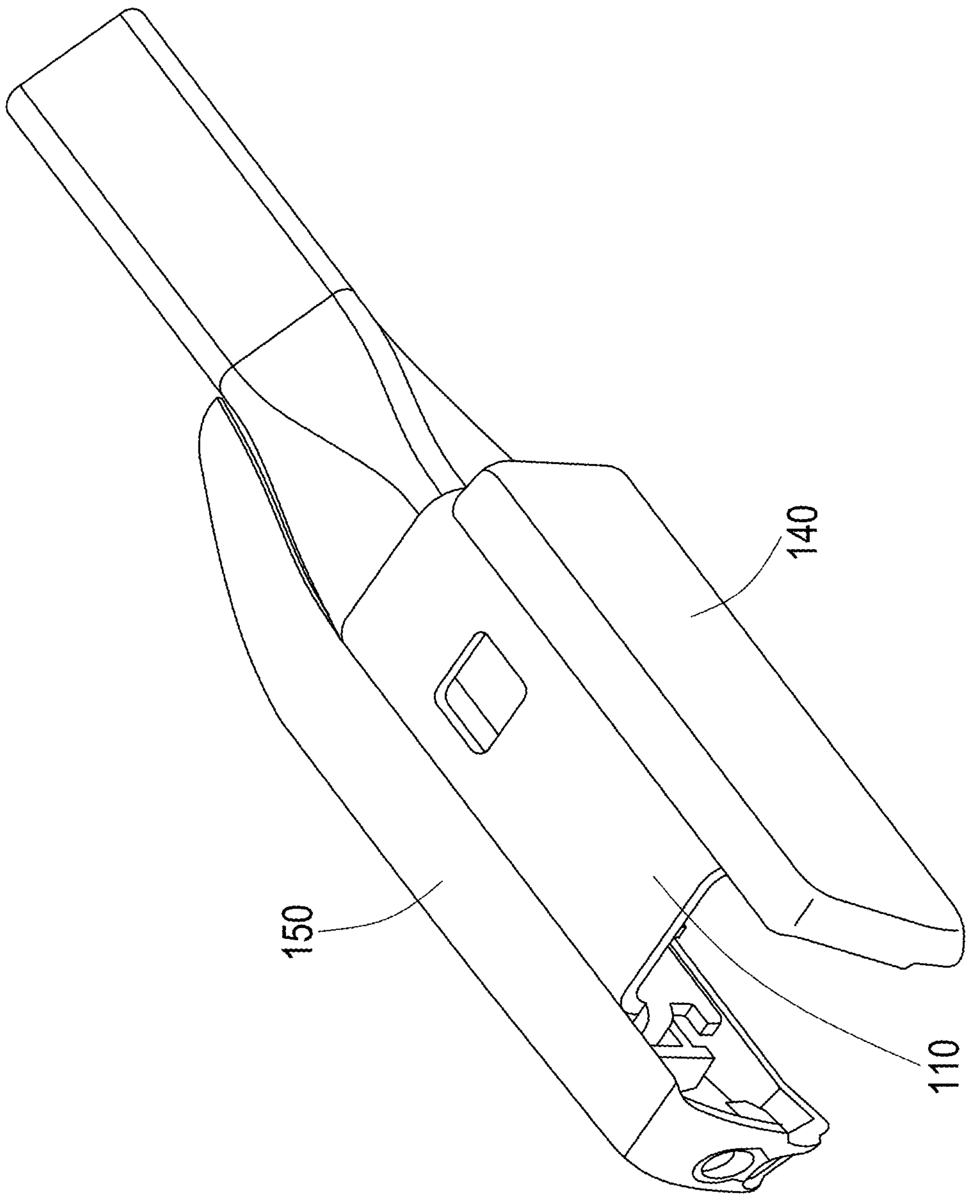
FIG. 4 is a perspective view of the adapter member, the first cover, and the second cover of FIG. 2.
Figure 5:
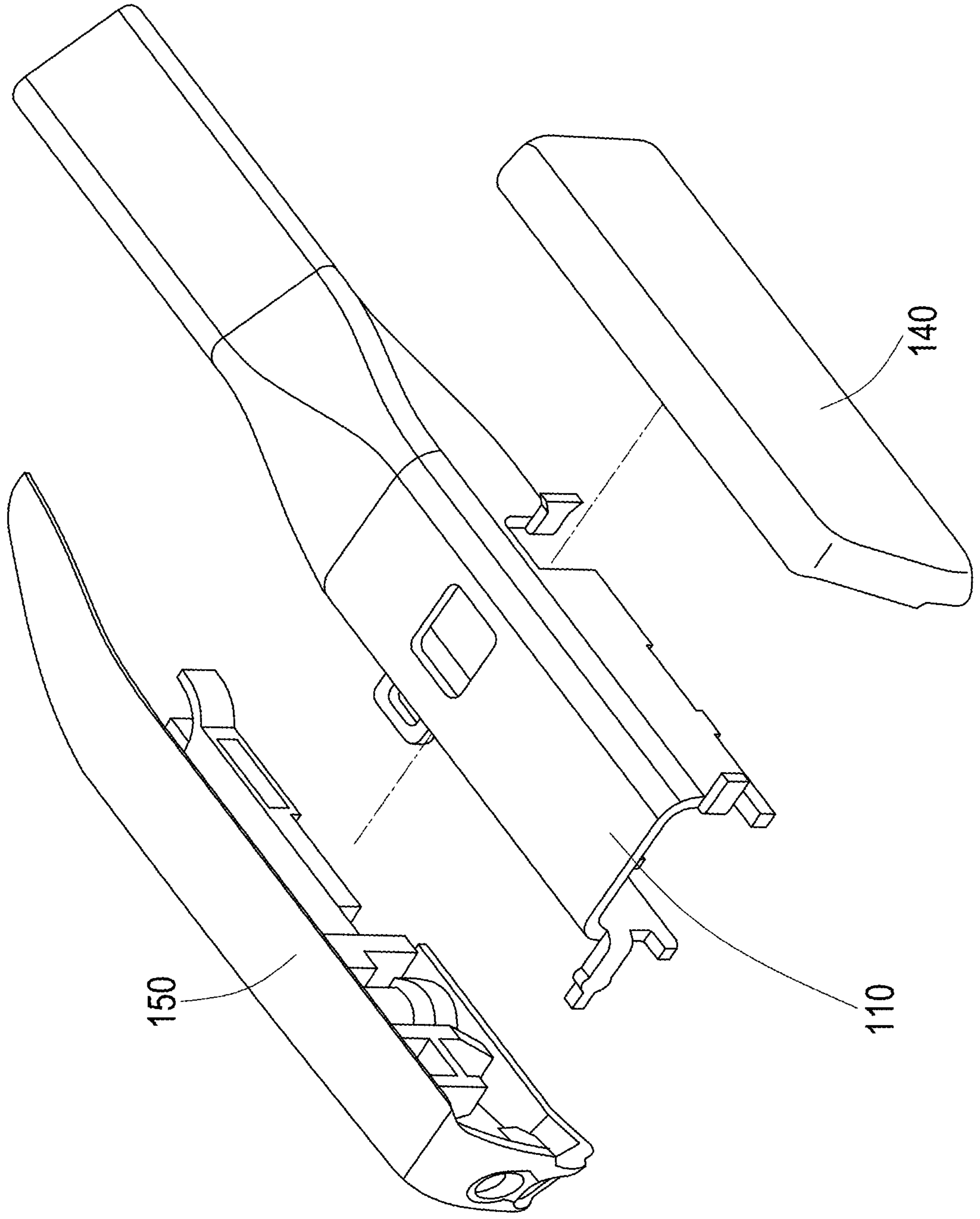
FIG. 5 is an exploded view of the adapter member, the first cover, and the second cover of FIG. 4.

FIG. 4 is a perspective view of the adapter member, the first cover, and the second cover of FIG. 2. FIG. 5 is an exploded view of the adapter member, the first cover, and the second cover of FIG. 4. Referring to FIG. 3 to FIG. 5, furthermore, the wiper device 100 of this embodiment further includes a first cover 140 and a second cover 150. The first cover 140 covers a gap G between the holding portion 1222 and the adapter member 110 and is attached to the adapter member 110 along a first direction D1 perpendicular to an extending direction E of the blade structure 120. The second cover 150 covers the gap G between the holding portion 1222 and the adapter member 110 and is attached to the adapter member 110 along a second direction D2 perpendicular to an extending direction E of the blade structure 120. The second direction D2 is, for example, opposite to the first direction D1.

As mentioned above, in the wiper device 100 of this embodiment, the first cover 140 and the second cover 150 are provided on the adapter member 110 and are configured to cover the gap G between the holding portion 1222 of the blade structure 120 and the adapter member 110. Accordingly, snow water in a low-temperature environment may be prevented from intruding into the interior of the adapter member 110. Thus, the wiper device 100 of this embodiment may prevent the adapter member 110 thereof from freezing in a low-temperature environment.

Referring to FIG. 3, the wiper device 100 of this embodiment further includes an injection nozzle unit 160. The injection nozzle unit 160 is configured to inject a washer liquid and is accommodated between the second cover 150 and the adapter member 110. In other embodiments, the injection nozzle unit 160 may be accommodated between the first cover 140 and the adapter member 110. That is, in addition to covering the gap G between the holding portion 1222 of the blade structure 120 and the adapter member 110, the first cover 140 or the second cover 150 is also configured to cover the injection nozzle unit 160.

In this embodiment, the top height of the first cover 140 and the top height of the second cover 150 are identical to the top height of the adapter member 110. That is, the top surface S1 of the first cover 140 and the top surface S2 of the second cover 150 are flush with the top surface S3 of the adapter member 110. Accordingly, the top portion of the first cover 140 and the top portion of the second cover 150 are not higher than the top portion of the first cover 140, which is beneficial to minimizing air resistance. In other embodiments, the top height of the first cover 140 and the top height of the second cover 150 may be smaller than the top height of the adapter member 110.

To sum up, in the wiper device of the disclosure, the first cover and the second cover are provided on the adapter member and are configured to cover the gap between the holding portion of the blade structure and the adapter member. Accordingly, snow water in a low-temperature environment may be prevented from intruding into the interior of the adapter member. Thus, the wiper device of the disclosure may prevent the adapter member thereof from freezing in a low-temperature environment.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. A wiper device, comprising:

an adapter member;

an arm portion coupled to the adapter member;

a blade structure, comprising:

an element portion and a blade portion, wherein the element portion has an insertion portion and a holding portion, the insertion portion is inserted into an interior of the adapter member, and the holding portion holds the blade portion below the adapter member, wherein the blade structure is movable together with the arm portion during a wiping operation;

a first cover, covering a gap between the holding portion and the adapter member and attached to the adapter member along a first direction perpendicular to an extending direction of the blade structure; and a second cover, covering the gap between the holding portion and the adapter member and attached to the adapter member along a second direction opposite to the first direction and perpendicular to the extending direction of the blade structure, wherein the first direction corresponds to a direction of one wiping action of the blade structure, wherein the second direction corresponds to a direction of another wiping action of the blade structure opposite to the direction of the one wiping action, wherein the first cover is disposed at a side of the gap corresponding to the direction of the one wiping action, wherein the second cover is disposed at a side of the gap corresponding to the direction of the another wiping action, wherein the gap is defined at a boundary between the insertion portion and the holding portion adjacent to where the insertion portion is inserted into the adapter member, wherein the gap has opposite openings opening respectively in the first direction and the second direction, wherein the holding portion includes portions protruding outward beyond opposite side surfaces of the insertion portion in the first direction and the second direction, respectively, wherein the portions of the holding portion that protrude outward from the insertion portion define the opening in the first direction and the opening in the second direction, respectively, wherein the first cover covers the opening in the first direction, and the second cover covers the opening in the second direction.

2. The wiper device according to claim 1, further comprising:

an injection nozzle unit, wherein the injection nozzle unit is configured to inject a washer liquid and is accommodated between one of the first cover and the second cover and the adapter member.

3. The wiper device according to claim 1, wherein a top height of the first cover and a top height of the second cover are identical to or less than a top height of the adapter member.

4. The wiper device according to claim 2, wherein a top height of the first cover and a top height of the second cover are identical to or less than a top height of the adapter member.

* * * * *